«12» United States Patent
Soong et al.

(10) Patent No.: US 7,496,513 B2
(45) Date of Patent: Feb. 24, 2009

(54) COMBINED INPUT PROCESSING FOR A COMPUTING DEVICE

(75) Inventors: Frank Kao-Ping Soong, Warren, NJ (US); Jian-Lai Zhou, Beijing (CN); Ye Tian, Beijing (CN)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 11/168,279

(22) Filed: Jun. 28, 2005

(65) Prior Publication Data

US 2006/0290656 A1   Dec. 28, 2006

(51) Int. Cl.
*G06K 9/18*  (2006.01)
*G10L 13/08* (2006.01)
*G10L 15/00* (2006.01)
*G06F 3/00*  (2006.01)
*G06F 3/048* (2006.01)

(52) U.S. Cl. .................. 704/260; 704/237; 715/811; 715/708; 382/186

(58) Field of Classification Search ............... 704/237, 704/260; 715/708, 811
See application file for complete search history.

(56) References Cited

U.S. PATENT DOCUMENTS 6,964,023 B2* 11/2005 Maes et al. ............... 715/811
2003/0225825 A1* 12/2003 Healey et al. ............ 709/203

OTHER PUBLICATIONS

U.S. Appl. No. 09/843,358, filed Apr. 2002, Chen.

* cited by examiner

*Primary Examiner*—David R Hudspeth
*Assistant Examiner*—Justin W Rider
(74) *Attorney, Agent, or Firm*—Westman, CHamplin & Kelly, P.A.

(57) ABSTRACT

Input is received from at least two different input sources. Information from these sources are combined together to provide a result. In a particular example, input from one source corresponds to potential recognition candidates, and input from another source corresponds to other potential candidates. These candidates are combined together to select a result.

12 Claims, 8 Drawing Sheets

COMBINED INPUT PROCESSING FOR A COMPUTING DEVICE

BACKGROUND

The discussion below is merely provided for general background information and is not intended to be used as an aid in determining the scope of the claimed subject matter.

There are a number of different input devices that provide input to a computer. For example, keyboards, pointing devices, touch screens, scanners, digital/video cameras and microphones can all be operably coupled to a computer in order for a user to provide input to the computer. Different input devices have different functions. Input from some devices, i.e., keyboards, pointing devices, and touch screens to a computer can be easily converted to commands executed by the computer. Other inputs (for example speech, handwriting, vision and gesturing) from scanners, digital/video cameras and microphones must be converted to computer commands with some artificial intelligence technology. Typically, these inputs utilize a recognizer that analyzes the user's input to provide a recognition result. These inputs can be prone to errors and/or take a long time to input. For example, handwriting input can take a user a large amount of time to input and speech recognition input can suffer from a high recognition error rate in a noisy environment. In particular, writing a character in an Asian language (i.e. Chinese, Japanese, Korean, etc.) can take numerous strokes of pen input. Even after the user has completed pen input, the recognition result may still not be correct.

SUMMARY

This Summary is provided to introduce some concepts in a simplified from that are further described below in the Detailed Description. This Summary is not intended to identify key features or essential features of the claimed subject matter, nor is it intended to be used as an aid in determining the scope of the claimed subject matter.

Input is received from at least two different input sources. Information from these sources are combined together to provide a result. In a particular example, input from one source corresponds to potential candidates and input from another source corresponds to other potential candidates. These candidates are combined together to select a result.

DETAILED DESCRIPTION

Before describing a system for combining input from separate input modes and methods for implementing the same, it may be useful to describe generally computing devices that can receive input from a user. These devices can be used in various computing settings to utilize various modes of input. The devices discussed below are exemplary only and are not intended to limit the present invention described herein.

Figure 1:
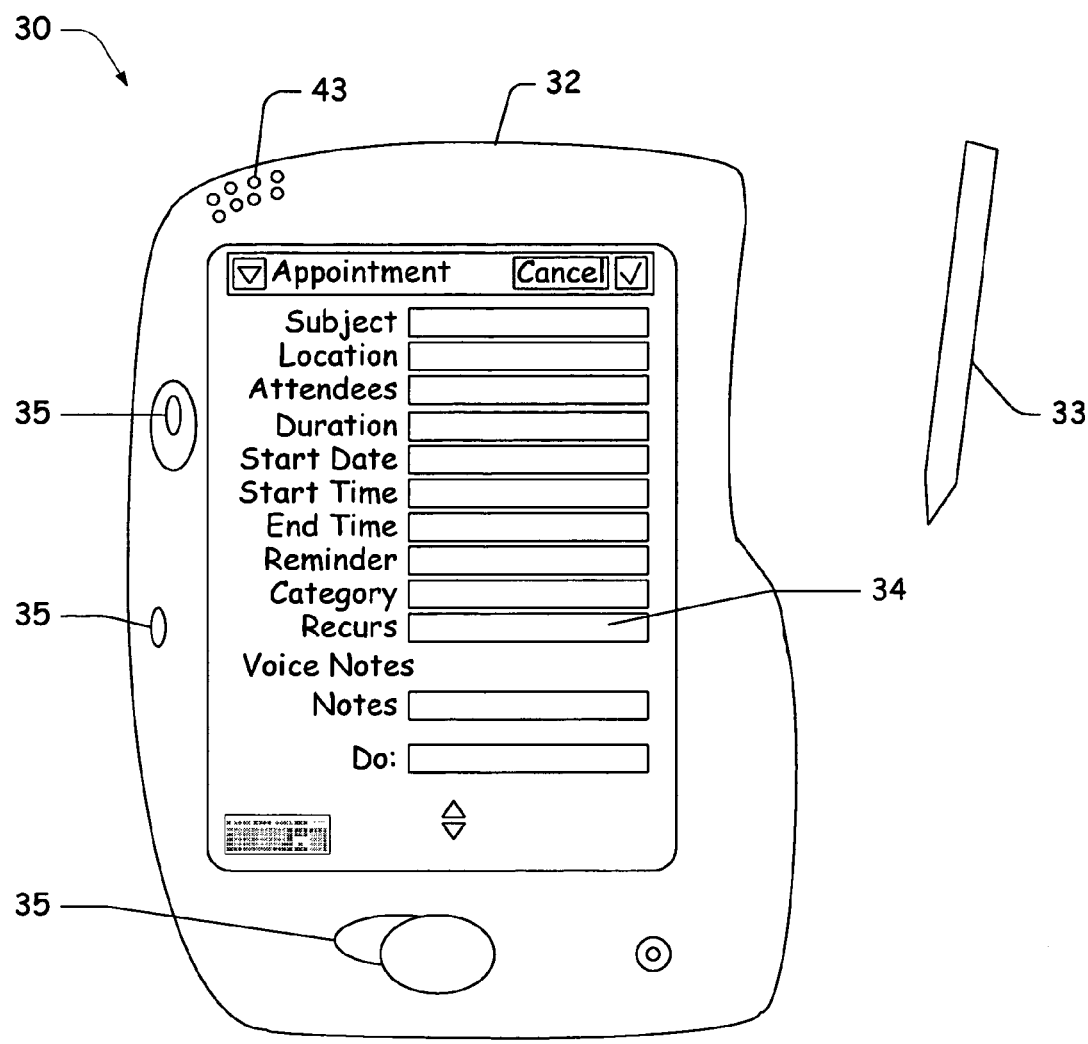
FIG. 1 is a schematic diagram of a mobile device.

An exemplary form of a data management mobile device 30 is illustrated in FIG. 1. The mobile device 30 includes a housing 32 and has a user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. Another form of input can include a visual input such as through computer vision.

Figure 2:
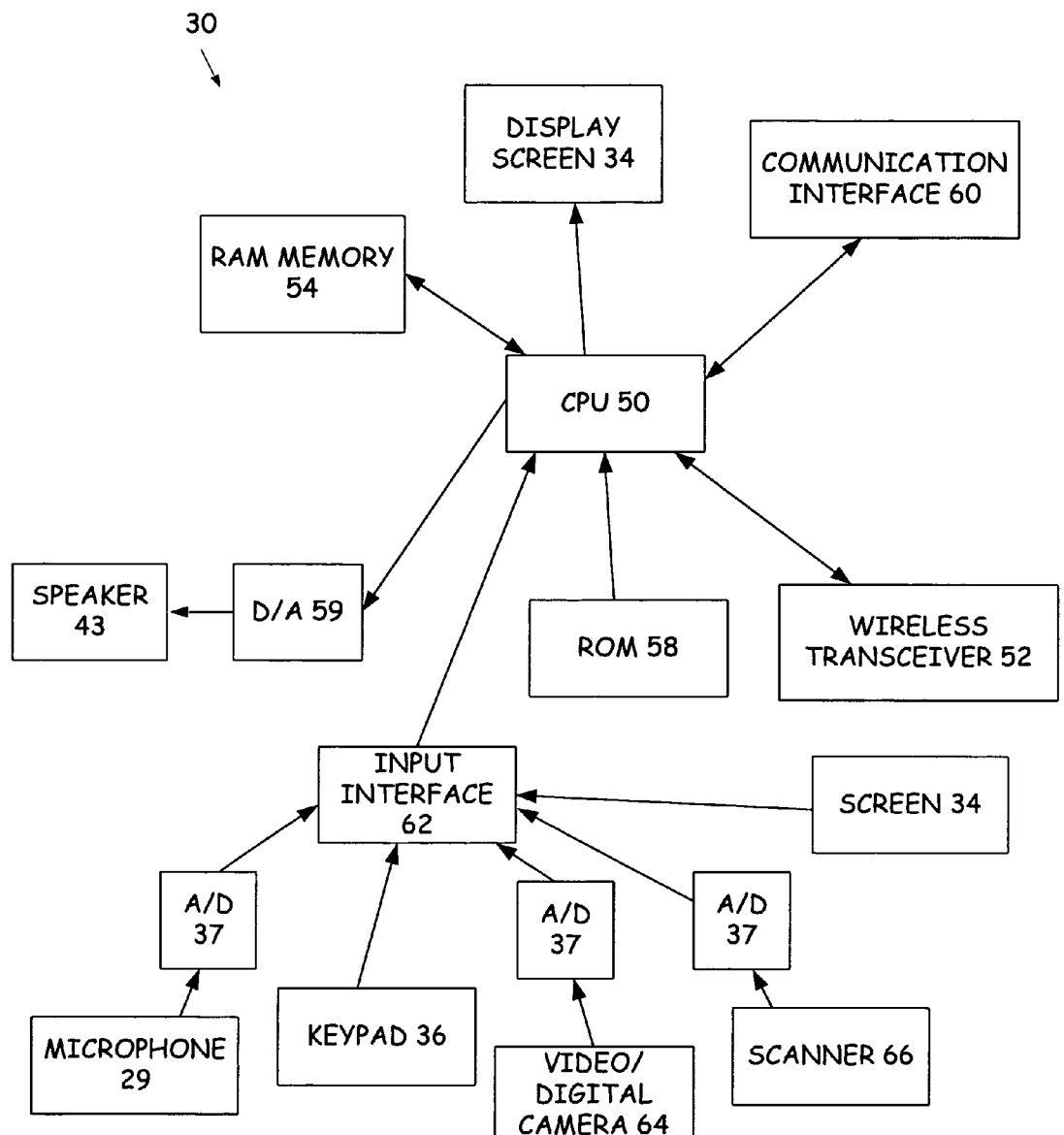
FIG. 2 is a block diagram of components in the mobile device of FIG. 1.

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile 30 and other operating system kernel functions (e.g., the loading of software components into RAM 54).

RAM 54 also serves as storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes an input interface 62 to receive input from a user. Example devices that provide input to input interface 62 include microphone 29, screen 34 (through stylus 33 or a touch), keypad 36, video/digital camera 64 and scanner 66. Device 30 also includes one or more analog-to-digital (A/D) converters 37 and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain speech recognition results.

Similar processing can be used for other forms of input. For example, handwriting input can be digitized on device 30. Likewise, gesture data and visual data can be processed similarly. Depending on the form of input, device 30 (and the other forms of clients discussed below) would include necessary hardware such as video/digital camera 64 for visual input.

Figure 3:
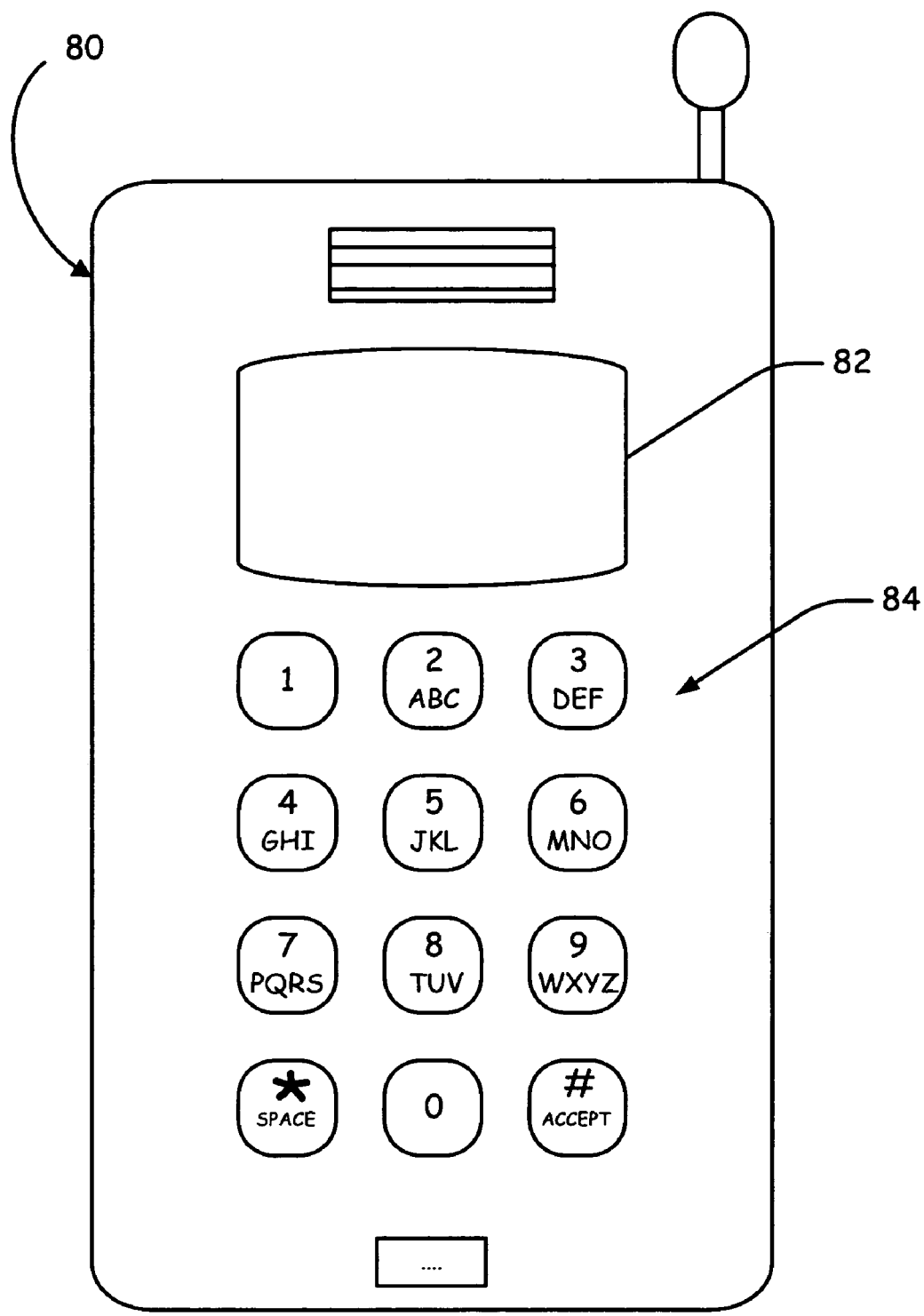
FIG. 3 is a front view of a phone.

FIG. 3 is a plan view of an exemplary embodiment of a portable phone 80. The phone 80 includes a display 82 and a keyboard or keypad 84. Generally, the block diagram of FIG. 2 applies to the phone of FIG. 3, although additional circuitry necessary to perform other functions may be required. For instance, a transceiver necessary to operate as a phone will be required for the embodiment of FIG. 2; however, such circuitry is not pertinent to the present invention. In some instances, a dictionary or other mechanism is utilized to resolve the intended character. Keys within keypad 84 can be associated with one or more letters and thus input corresponding to the letters needs to be resolved as to which letter was intended. Keypad 84 is distinguished from a standard keypad in that it does not have a unique key for each letter. As such, keypad 84 can be referred to as having a reduced or limited set of keys.

In addition to the portable or mobile computing devices described above, input can be provided to numerous other computing devices such as a general desktop computer. Additionally, various input devices can allow a user with limited physical abilities to input or enter text into a computer or other computing device when other conventional input devices, such as a full alpha-numeric keyboard, are too difficult to operate.

Input can further be provided to numerous other general purpose or special purpose computing systems, environments or configurations. Examples of well known computing systems, environments, and/or configurations that may be suitable for use with the invention include, but are not limited to, regular telephones (without any screen) personal computers, server computers, hand-held or laptop devices, multiprocessor systems, microprocessor-based systems, set top boxes, programmable consumer electronics, radio frequency identification (RFID) devices, network PCs, minicomputers, mainframe computers, distributed computing environments that include any of the above systems or devices, and the like.

Figure 4:
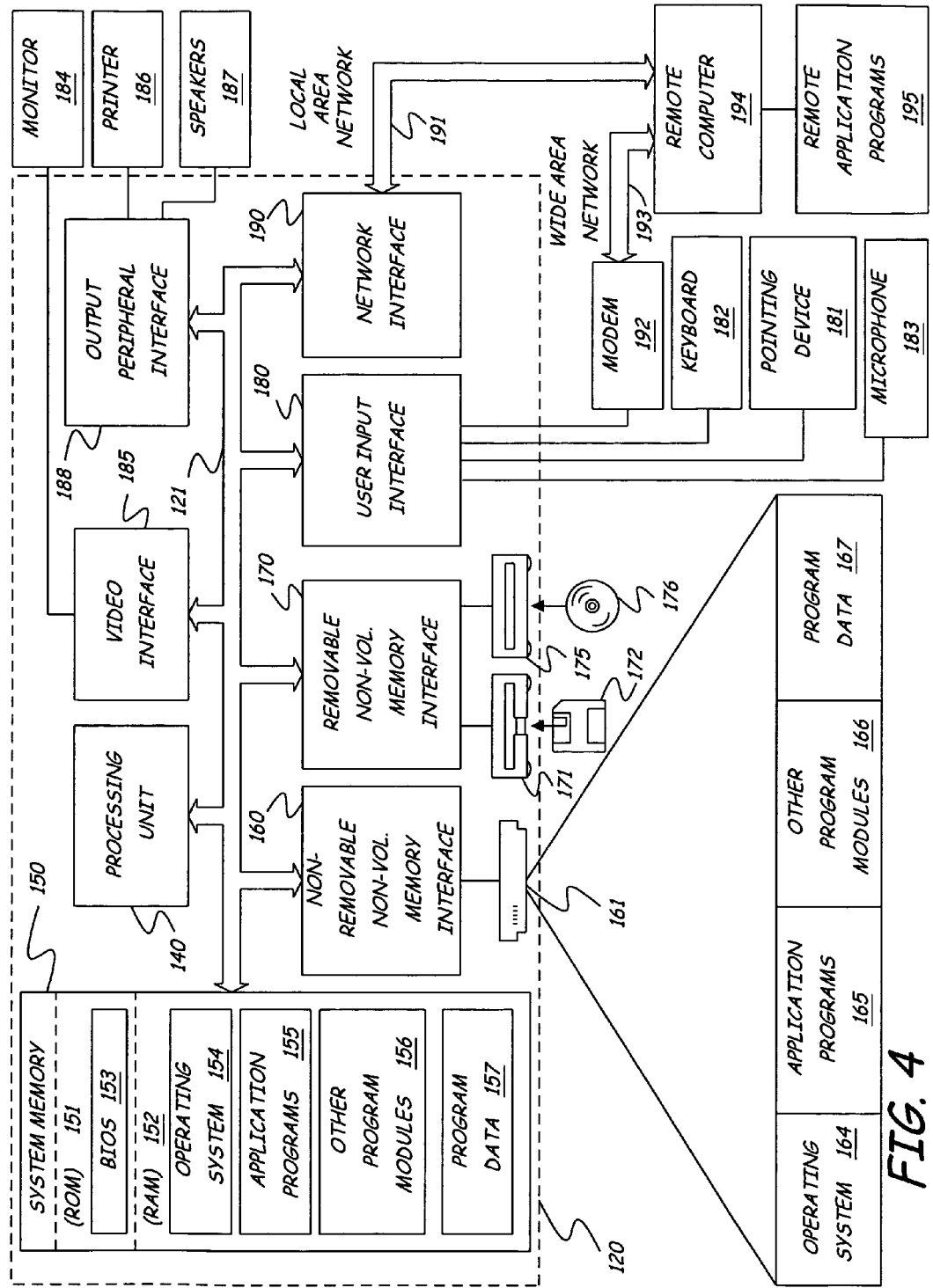
FIG. 4 is a block diagram of a general computing environment.

The following is a brief description of a general purpose computer 120 illustrated in FIG. 4. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 4, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 4 illustrates operating system 54, application programs 155, other program modules 156, and program data 157.

The computer 120 may also include other removable/non-removable volatile/nonvolatile computer storage media. By way of example only, FIG. 4 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 4, provide storage of computer readable instructions, data structures, program modules and other data for the computer 120. In FIG. 4, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 4 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 4 illustrates remote application programs 195 as residing on remote computer 194. It will be appreciated that the network connections shown are exemplary and other means of establishing a communications link between the computers may be used.

Figure 5:
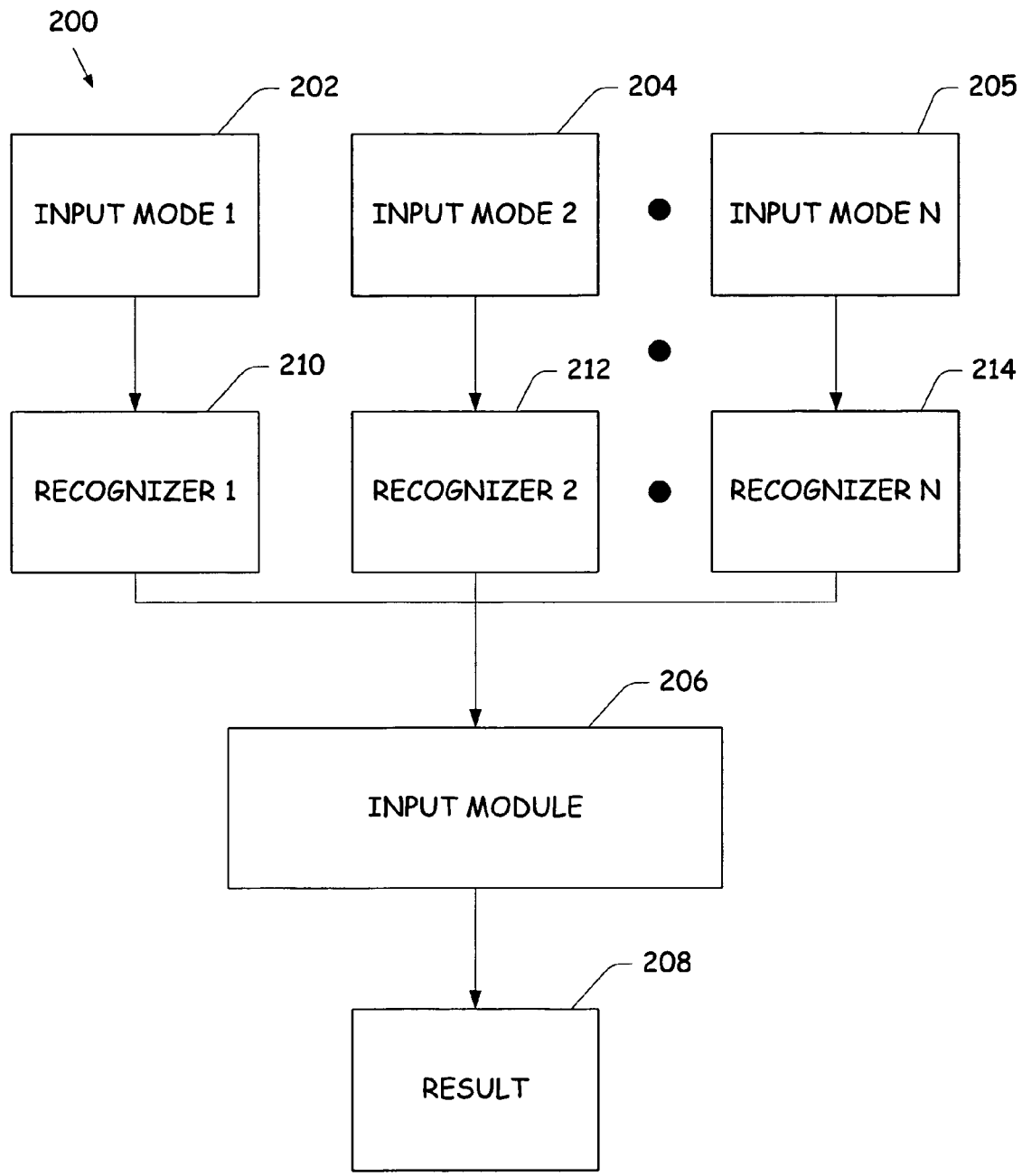
FIG. 5 is a block diagram of an input processing system.

FIG. 5 is a block diagram of an input processing system 200. System 200 includes a first input mode 202 and a second input mode 204. It is worth noting that system 200 can be expanded to receive inputs from more than two sources. Input mode 205 represents further input modes in system 200. Input mode 202 can provide a different mode of input than input mode 204. For example, input mode 202 can be handwriting input such as from a pen while input mode 204 can be speech data from a user to a microphone. Recognizer 210 is responsible for parsing input 202 to computer commands. The output may be a single result or multiple results. Recognizer 212 is responsible for parsing input 204 to computer commands. The output may also be a single result or multiple results. Combination module 206 accepts input from both modes 210 and 212. Depending on the input received, combination module 206 provides a result 208. Combination module can be configured to include inputs from more than two sources to provide result 208. In this case, additional, input modes, such as mode 205 can utilize one or more recognizers, for example recognizer 214.

Figure 6:
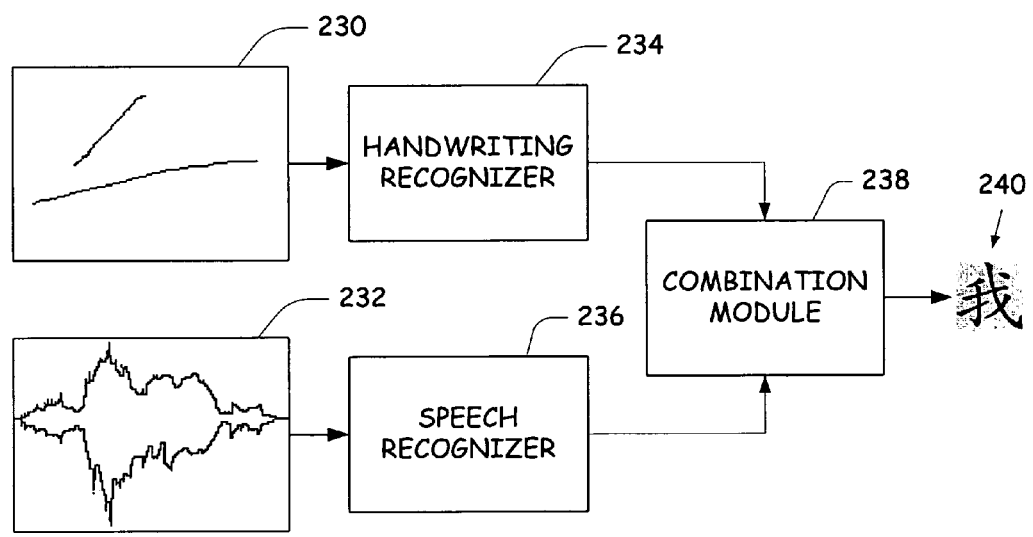
FIG. 6 is a block diagram of an input processing system for a particular scenario.
Figure 7:
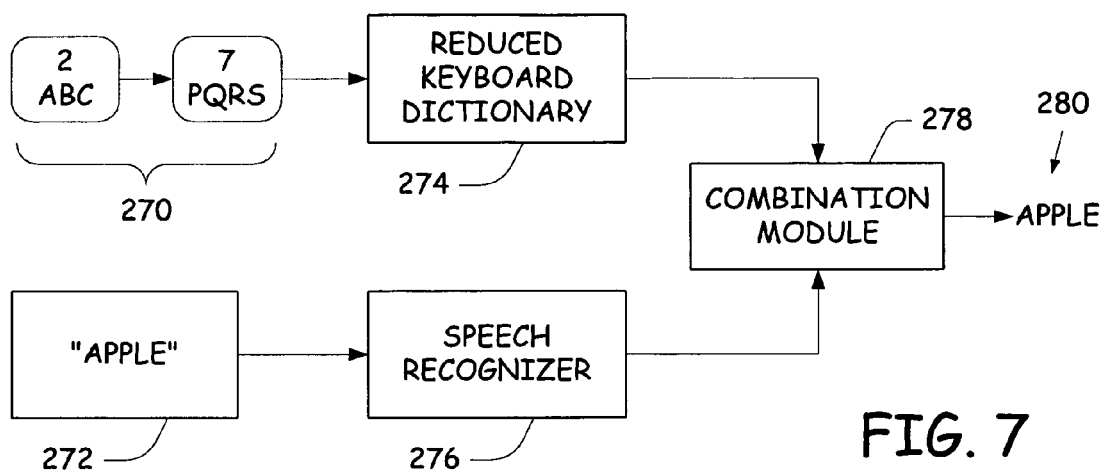
FIG. 7 is a block diagram of an input processing system for a particular scenario.
Figure 8:
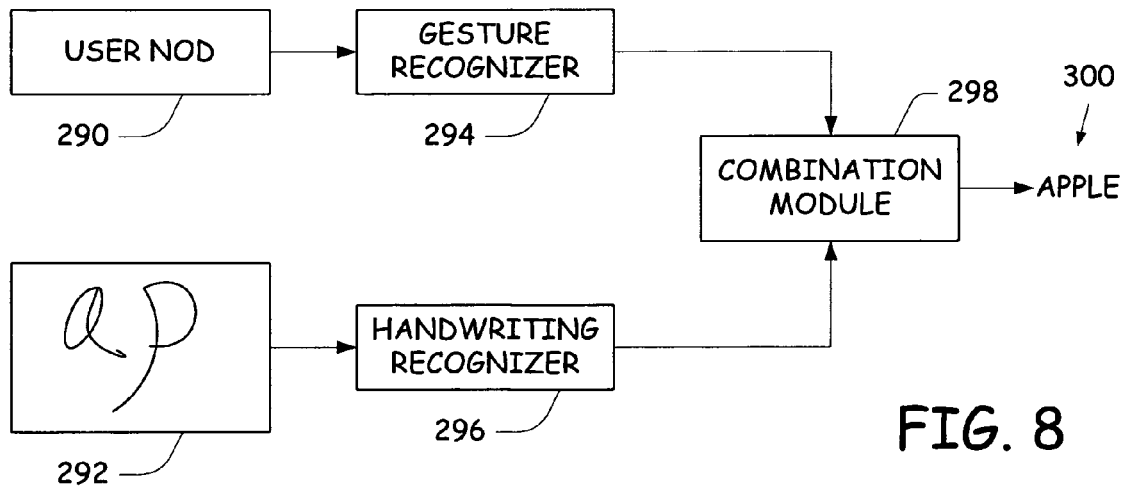
FIG. 8 is a block diagram of an input processing system for a particular scenario.

In one manner of use for system 200, input from a user is provided to input mode 202 and input mode 204 at substantially the same time. Combination module 206 combines input from both modes such that less input from either and/or both modes is needed to provide result 208. In another manner of use, potential candidates (or hypotheses) from different recognizers are combined and rescored to provide a more accurate result 208. For example, hypotheses from a handwriting recognizer and a speech recognizer are combined to provide a single result 208. In one example, the hypotheses can be in a word graph or an N-Best list. The recognizers 210, 212 and 214 can be a speech recognizer, a handwriting recognizer or a gesture recognizer, for example. System 200 can thus be used to resolve input from different input sources. For example, handwriting input can be related to a character, a word, an equation and/or a shape. A different input source is used to determine a desired result of the handwriting input. For example, system 200 can aid in resolving ambiguities between confusable characters (e.g. {ω,w} or {ξ,ζ}). FIGS. 6-8, which are described below, provide several scenarios for input processing system 200.

FIGS. 6-8 are block diagrams of different scenarios for an input module. In FIG. 6, a user has provided handwriting input 230 and speech input 232. Handwriting input 230 includes two strokes, which is intended for the Chinese character 我. Input 230 corresponds to input from a touch-enabled pad. Additionally, the user has provided speech data 232, which represents the character 我. Handwriting input 230 is sent to a handwriting recognizer 234 that begins to formulate hypotheses as to the character input intended by handwriting input 230. Likewise, speech data 232 is sent to speech recognizer 236 to produce hypotheses as to what character was spoken. The hypotheses produced by handwriting recognizer 234 and speech recognizer 236 include lists of recognition candidates and are sent to combination module 238. Combination module 238 determines an output 240 based on the hypotheses, herein the Chinese character 我. As a result, a user needs only to input a few handwriting strokes and speak a desired character. This process provides more accurate recognition as well as reduced time to provide input.

FIG. 7 is a scenario that uses a reduced keyboard and speech as input, for example using a phone. The user has provided keyboard input 270, which includes the numbers 2 and 7. The numbers 2 and 7 correspond to locations on a keyboard. The number 2 represents the characters A, B and C while the number 7 represents characters P, Q, R and S. Additionally, the user has spoken the word "apple", which corresponds to speech input 272. A reduced keyboard dictionary 274 receives input 270 and produces hypotheses based on this input. Speech recognizer 276 receives speech input 272 and also produces hypotheses based on the speech input 272. Hypotheses from reduced keyboard dictionary 274 and speech recognizer 276 are sent to a combination module 280. Combination module 280 combines the hypotheses and provides an output 280, herein the word apple.

FIG. 8 illustrates a scenario where a user provides gesture input and handwriting input, for example using a camera and a pen. Gesture input 290 is a nod and pen input 292 includes the letters A and P. Pen input 292 corresponds to a location. Gesture recognizer 294 accepts the gesture input 290 and produces hypotheses based on user gesture 290. Handwriting recognizer 296 receives handwriting input 292 and formulates hypotheses based on the input. A list produced by handwriting recognizer 296 can be presented to the user such that the user can provide a confirmation of the desired input. For example, after the user has written the letters A and P, a list, which has apple as the first hypotheses, is presented to the user. User nod 290 confirms that the word apple is the desired result by nodding. Combination module 298 combines the output from gesture recognizer 294 and handwriting recognizer 296 to provide an output 300, herein the word apple.

Figure 9:
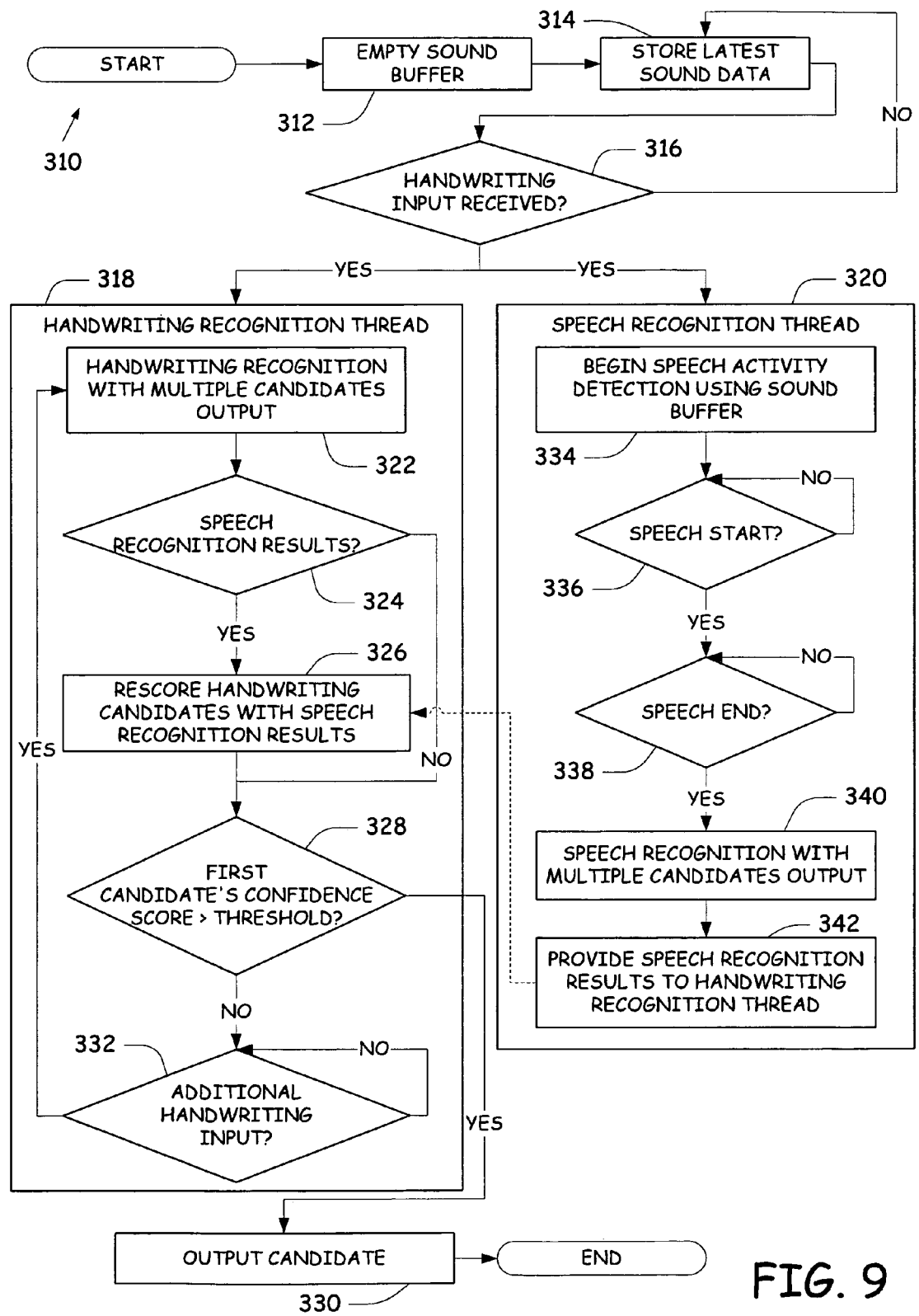
FIG. 9 is a flow diagram of a method of combining handwriting input and speech input.

FIG. 9 is a flow diagram of a method 310 for combining handwriting recognition results and speech recognition results. At step 312, a sound buffer is emptied. The sound buffer is used to receive a speech utterance from a user. At step 314, the latest sound data is stored in the sound buffer. The sound data can be used when performing speech recognition. At step 316, it is determined whether handwriting input has been received from a user. If no handwriting input is received, method 310 returns to step 314, wherein the latest sound data is stored in the buffer. Once handwriting input is received, method 310 proceeds to both a handwriting recognition thread 318 and a speech recognition thread 320. Thus, adequate timing boundaries can be established for speech recognition since it is more likely a user will speak a desired result while providing handwriting input.

Handwriting recognition thread 318 begins with step 322, wherein handwriting recognition is performed on handwriting input and multiple candidates with associated confidence scores for the handwriting recognition are output. Various methods for handwriting recognition and production of recognition candidates can be used. At step 322, it is determined whether speech recognition results have been received from speech recognition thread 320. If speech recognition results have been received from speech recognition thread 320, the handwriting candidates are rescored with the speech recognition results at step 326. Rescoring can include merging candidate list from the handwriting recognition thread 318 and speech recognition thread 320 to select the best candidate with the highest score. If there are no speech recognition results at step 324, step 326 is skipped and handwriting recognition thread 318 proceeds to step 328. At step 328, the first candidate's confidence score is compared to a threshold. If the score is greater than the threshold, the candidate is output at step 330. If the confidence score is less than the threshold, thread 318 proceeds to step 332, wherein thread 318 waits for additional handwriting input. Once additional handwriting input is received, thread 318 returns to step 322.

Speech recognition thread 320 begins at step 334, wherein speech activity detection begins using the sound buffer. The speech activity detection begins based on when handwriting input is received. It is more likely that a speech utterance from a user will likely be received around the time that handwriting input is provided by the user. Thus, this timing can be used to improve signal to noise ratio estimation for speech recognition. Speech recognition thread 320 then waits for a speech utterance from user to start at step 336. Once the speech utterance begins, speech recognition thread waits for the speech utterance to end at step 338. Once the speech utterance has ended, speech recognition is performed on the utterance to provide multiple candidates with associated confidence scores at step 340. For example, a list of speech recognition candidates can be output. The speech recognition results are provided to handwriting recognition thread 318 at step 342. As discussed above, these results are used to rescore handwriting recognition candidates.

Based on the subject matter described above, input from different modes can be combined for processing by a computing device. For example, one input can include several potential candidates while one input can be used in re-selecting/re-sorting candidates to get a final result.

Although subject matter above has been described with reference to particular embodiments, workers skilled in the art will recognize that changes may be made in form and detail without departing from the spirit and scope of the appended claims.

What is claimed is:

1. A computer-implemented method of determining and displaying a collection of text, the method comprising:
   receiving a handwriting input from a first input source, wherein the handwriting input is an incomplete handwriting representation of the collection of text, the handwriting input being intentionally incomplete in that it is intentionally formed by a user to approximate only a limited portion of the collection of text, the limited portion being less than the entirety of the collection of text;
   receiving a speech input from a second input source, wherein the speech input is a representation of the collection of text in its entirety;
   determining the collection of text, the determination being based on a relative interrelation of recognition analysis performed on the handwriting input with recognition analysis performed on the speech input, wherein the relative interrelation is such that the determination is not independently dictated by the recognition analysis of either of the speech and handwriting inputs; and
   displaying the collection of text on a display associated with a computing device.

2. The method of claim 1, wherein determining the collection of text comprises combining a handwriting recognition outcome probability with a speech recognition outcome probability, the handwriting recognition outcome probability and the speech recognition outcome probability each being a probability that a particular candidate string of text is the collection of text.

3. The method of claim 2, wherein neither of the handwriting and speech recognition outcome probabilities indicates an absolute certainty that the particular candidate string of text is the collection of text.

4. The method of claim 3, wherein determining the collection of text comprises utilizing the handwriting input as a basis for identifying a plurality of candidate strings of text, and wherein determining also comprises utilizing the speech input as a basis for assigning a likelihood to each of the plurality of candidate of strings, the likelihood being a probability that the candidate string is the collection of text, and wherein the likelihood is not an indication of absolute certainty that a particular candidate string is the collection of text.

5. The method of claim 1 wherein the input from the first input source corresponds to a plurality of potential candidates.

6. The method of claim 5 and further comprising:
selecting one candidate from the plurality of potential candidates as the result based on the input from the second source.

7. A method of identifying and displaying a text character, the method comprising:
receiving a first input corresponding to a plurality of different potential text character candidates;
receiving a second input, the second input being a speech input that is a representation of a specific one of the plurality of different potential text character candidates, the specific one being said text character;
determining the text character, the determination being based on a relative interrelation of recognition analysis performed on the first and second inputs, and wherein the relative interrelation involves processing the first input so as to identify the plurality of different potential text character candidates and processing the second input so as to determine the specific one of the different potential text character candidates; and
displaying the text character on a display associated with a computing device.

8. The method of claim 1, further comprising utilizing the determination to enhance the performance of the recognizer utilized to perform the recognition analysis on the handwriting input.

9. A computer-implemented method of identifying and displaying a collection of text, the method comprising:
receiving a handwriting input from a first input source, the handwriting input being a representation of at least a portion of the collection of text;
receiving a speech input from a second input source, the speech input being a representation of the collection of text;
performing handwriting recognition on the handwriting input so as to generate a plurality of handwriting recognition outcome candidates, each handwriting recognition outcome candidate being assigned a confidence score that indicates a likelihood that the candidate is the same as the collection of text;
performing speech recognition analysis on the speech input;
adjusting, based on a result of the speech recognition analysis, one or more of the confidence scores so as to increase the likelihood that the candidate is the same as the collection of text; and
determining whether any of the adjusted confidence scores is greater than a pre-established confidence threshold;
accepting as the collection of text a particular handwriting recognition outcome candidate associated with a confidence score greater than the pre-established confidence threshold;
displaying the particular recognition outcome candidate.

10. The method of claim 9, wherein adjusting comprises adjusting to a level that is still less than one hundred percent confidence.

11. The method of claim 9, wherein adjusting comprises adjusting to account for one or more confidence scores associated with a plurality of speech recognition outcome candidates.

12. The method of claim 9, wherein adjusting merging confidence scores associated with the handwriting recognition outcome candidates with confidence scores associated with a plurality of speech recognition outcome candidates generated based on the speech input as a result of the speech recognition analysis.

* * * * *